July 19, 1932.  J. L. BERTHET ET AL  1,868,133

LIQUID METER

Filed Jan. 3, 1929

Inventors:
Jean Louis Berthet Gaytan
Michel
per Fred F. Barton
Attorney

Patented July 19, 1932

1,868,133

UNITED STATES PATENT OFFICE

JEAN LOUIS BERTHET AND GAYTAN MICHEL, OF SAN SEBASTIAN, SPAIN, ASSIGNORS TO COMPAGNIE POUR LA FABRICATION DES COMPTEURS ET MATERIAL D'USINES A GAZ SOCIÉTÉ ANONYME FRANÇAISE, OF MONTROUGE, FRANCE

LIQUID METER

Application filed January 3, 1929, Serial No. 329,985, and in France January 9, 1928.

Our invention relates to a liquid meter of the type provided with magnetic control of the dials, and in which there is a total absence of gear trains and stuffing boxes.

The principal characteristics of the invention reside in employing, for actuating the mechanism of the meter, a disk of tempered steel having a maximum hysteresis coefficient and minimum thickness for preventing any falling out of step while producing rapid driving, whatever be the rapidity in starting and the value of the speed acquired by the upper magnet.

Likewise, in order to lighten the turbine wheel and the circular magnet thereof as well as the steel disk in order to assure maximum sensitiveness in the meter during small flow as well as exactness in totalizing, we suspend the turbine wheel as well as the magnet thereof on a float adapted to be displaced from top to bottom or vice versa.

Our invention will be more readily understood by those skilled in the art to which our invention relates in the accompanying drawing forming part of this specification and in which—

Figure 1:
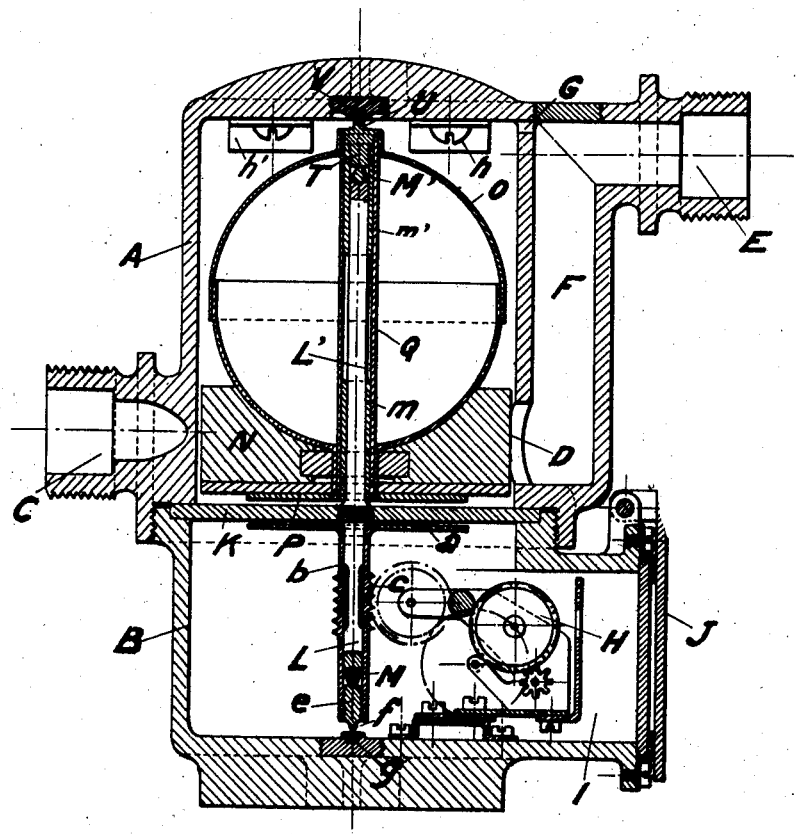
Fig. 1 is a sectional view through our improved meter.

Referring to the drawing more in detail, the apparatus comprises an upper casing A (Fig. 1) which screws on a lower body B. The water inlet orifice C is disposed tangentially to the casing A. The orifice D likewise disposed tangentially, communicates with the water outlet of the meter E through a channel F. The inner wall of the channel F is provided with an orifice G adjacent the level of the head of casing A for establishing communication between said channel and said casing at such point.

The lower body B contains the dial work H. Readings are made through the opening I which is closed by the cover J. The lower body B is separated from the casing A by a plate K of insulating or other material of non-magnetic metal which assures absolute fluid tightness of the dial work.

A double spindle of nickel L L' is secured to the center of the plate K. Two jewel bearings M and M' are fitted respectively to the extremities of said spindle.

Figure 2:
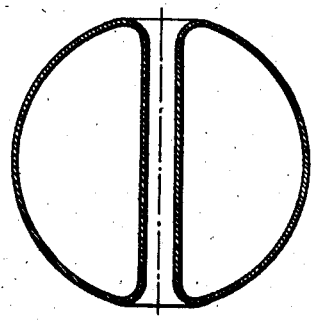
Fig. 2 is a detail sectional view through the float thereof.

The part L' of the spindle carries the turbine wheel N surmounted by a float O of copper, delta, glass or other suitable material (Fig. 2) adapted to resist high pressures.

The magnetic disk P (Fig. 1) is fixed to the lower part of the turbine wheel N.

The float is traversed along the vertical axis thereof by a tube Q of brass or other suitable material. At the lower extremity of said tube is secured the turbine wheel N and the circular magnet thereof and the said tube is lined on its inner wall at that point with an ebonite sleeve $m$. The upper part of said tube is likewise lined on the interior with an ebonite sleeve $m'$ closed by a nickel plug T which bears on the jewel M'. A counter pivot U is seated upon a flat stone V fitted in the head of the casing A.

The part of the spindle contained in the lower body B, guides the steel disc $a$ in its movement of rotation. The tempered steel disk $a$ is fixed to a tube of brass metal $b$ carrying a worm $c$ destined to actuate the dial work H. The lower extremity of the tube $b$ is closed by a nickel plug $e$ which serves on the one hand as a seat for the jewel M and on the other hand acts as a counter pivot bearing on a flat stone $g$ at $f$, said stone $g$ being fitted into the bottom of the lower body B and forming a seat for the pivot $f$.

Paddles such as $h$ and $h'$ are provided for the purpose of advancing or retarding the meter by varying the angle thereof with respect to the line of flow.

Driving of the steel disk by the circular magnet P takes place in the following manner:

The total flux which is constant of the circular magnet P tends to form through the disk $a$ where induction is represented by the product of the total field and the inverse of the transverse section of the disk $a$.

When the system is at rest, the disk $a$ is magnetized by the magnet P and the polar axis thereof will be in the direction of that of the magnet P. If a movement of rotation be imparted to magnet P and if, during this movement, the disk $a$ is maintained stationary, the axis of the flux thereof will synchronously follow the axis of the flux of magnet P but shifted out of phase therewith in the lagging direction by an angle which is dependent upon the hysteresis thereof.

Obviously therefore this lagging effect may be readily utilized for the demagnetization or hysteresis of the disk $a$ in order to produce a torque for driving it.

Obviously the poles of the disk $a$ do not change direction unless the coercive field is sufficient, that is, if the value of the field necessary to destroy magnetization of the disk P is sufficient. This property has led us to employ a very powerful magnet for P with respect to the weaker disk $a$.

Consequently, whatever be the inertia to overcome, we obtain a maximum constant torque, which is a function of the hysteresis angle and independent of relative movement of the arrangement, that is, be it synchronous or asynchronous.

If the force necessary to drive the disk $a$ increases in a way to become greater than the torque at maximum dephased position, the field emanating from the magnet P becomes, due to dephasing, equal to the coercive field of the disk $a$ and returns the axis of the poles thereof to the value of the hysteresis angle corresponding to maximum torque. The movement of the arrangement is therefore asynchronous.

This phenomena takes place as long as the driving force does not become equal or less than the maximum torque, and obviously as long as the force necessary to drive the disk $a$ does not pass the maximum torque caused by the hysteresis angle, the movement of the two disks is synchronous.

From the foregoing two conclusions may be drawn:

1st. The movement of the two fluxes is always synchronous and only the dephasing angle between them varies.

2nd. The movement of the two disks is asynchronous at the start and becomes synchronous when the torque by the dephasing at a maximum is sufficient to overcome the inertia of the disk $a$. Said inertia being very small, the duration of the asynchronous movement of the two disks is very short.

Furthermore, the resistance offered by the dial work being very small in comparison to the corresponding torque of the maximum hysteresis angle, it does not interfere with the synchronous movement of the two disks.

Obviously the driving magnets might be given other forms without departing from the principle of driving by hysteresis.

The operation of the meter takes place as follows:

If the most unfavorable conditions be assumed, that is, the meter operating with the faucet placed in front of the inlet orifice C, water enters therethrough and passes into the upper casing A, leaving by the orifice D.

One of the conditions of most importance to be fulfilled for proper operation of the meter resides in the fact that the casing A must become completely filled with water for ensuring absolute floating of the float O during running of the meter. This condition is fulfilled, for the water rises in the casing A at the same time as in the channel F driving out the air through the hole G. The air is therefore completely evacuated from the interior when the water attains the upper part of the casing A.

The magnetized disk P by the attraction which it exerts, tends to balance the steel disk $a$ and the worm $c$ thereof, designed in such a way that their total weight is equal to the force of attraction exerted by the magnetized disk P. As the magnetized disk P is rigid with the turbine wheel N and said turbine wheel is rigid with the float O, said float while floating in suspension on the water supports the whole arrangement and compensates for the weights of the turbine wheel and the magnetic disk, or at least renders the friction on the pivots L L' negligible. The sensitiveness and exactitude are therefore brought to a maximum for very small measurements of flow.

Having described our invention what we claim as new and desire to secure by Letters Patent of the United States of America is:

1. In a liquid meter, a casing having a chamber, a liquid-tight partition dividing the chamber of the casing into two superposed compartments, an indicating mechanism in one compartment, said casing having an inlet and an outlet for the liquid in the other compartment, a shaft vertically extending through both compartments and fixedly carried by said partition, a turbine wheel rotatable upon said shaft in the said other compartment, a circular magnet rotatable on said shaft and fixed to said turbine wheel adjacent said partition, a very thin non-magnetized disc of tempered steel in said one compartment and adapted to be driven by said magnet, means surrounding said shaft for rotatably supporting said non-magnetized disc adjacent said partition, means connecting said supporting means to the indicating mechanism, and a float surrounding said shaft in the said other compartment, fixed to said turbine wheel and adapted to compensate for the weight of said rotor and the elements carried thereby to reduce the friction of rotation of said rotor and magnet.

2. In a liquid meter, a casing having a chamber, a liquid-tight partition dividing the chamber of the casing into two superposed compartments, an indicating mechanism in one compartment, said casing having an inlet and an outlet for the liquid in the other compartment, a shaft vertically extending through both compartments and fixedly carried by said partition, a turbine wheel rotatable upon said shaft in the said other compartment, a circular magnet rotatable on said shaft and fixed to said turbine wheel adjacent said partition, a non-magnetized disc of tempered steel having a maximum hysteresis coefficient and minimum thickness in said one compartment and adapted to be driven by said magnet, means surrounding said shaft for rotatably supporting said non-magnetized disc adjacent said partition, means connecting said supporting means to the indicating mechanism, and a float surrounding said shaft in the said other compartment, fixed to said turbine wheel and adapted to compensate for the weight of said rotor and the elements carried thereby, to reduce the friction of rotation of said rotor and magnet.

3. In a liquid meter, a casing having a chamber, a liquid-tight partition dividing the chamber of the casing into two superposed compartments, an indicating mechanism in one compartment, said casing having an inlet and an outlet for the liquid in the other compartment, a shaft vertically extending through both compartments and fixedly carried by said partition, a turbine wheel rotatable upon said shaft in the said other compartment, a circular magnet rotatable on said shaft and fixed to said turbine wheel adjacent said partition, a non-magnetized disc of tempered steel having a maximum hysteresis coefficient and minimum thickness in said one compartment and adapted to be driven by said magnet, means surrounding said shaft for rotatably supporting said non-magnetic disc adjacent said partition, a worm carried by said supporting means for operatively connecting said supporting means to the indicating mechanism, and a spherical float surrounding said shaft in the said other compartment, fixed to said turbine wheel and adapted to compensate for the weight of said rotor and the elements carried thereby to reduce the friction of rotation of said rotor and magnet.

4. In a liquid meter, a casing having a chamber, a liquid-tight partition dividing the chamber of the casing into two superposed compartments, an indicating mechanism in one compartment, an inlet conduit tangentially communicating with the bottom of the other compartment, an outlet conduit for said other compartment communicating with the bottom thereof, there being an opening interconnecting the top of said other compartment and said outlet conduit and acting as an air vent, a shaft vertically extending through both compartments and fixedly supported by said partition, a turbine wheel rotatable upon said shaft near the bottom of the said other compartment, a circular magnet rotatable upon said shaft adjacent said partition and fixed to said turbine wheel, a non-magnetized disc of tempered steel having a maximum hysteresis coefficient and minimum thickness adapted to be driven by said magnet, means rotatable upon said shaft in the said one compartment to support the said disc adjacent said partition, means connecting said supporting means to said indicating mechanism, and a float rotatable upon said shaft in the said other compartment, fixed to said rotor so as to compensate for the weight of the rotor and the elements carried thereby, to reduce the friction of rotation.

In testimony whereof we hereunto affix our signatures.

JEAN LOUIS BERTHET.
GAYTAN MICHEL.